United States Patent [19]

Heinhold et al.

[11] Patent Number: 4,974,965
[45] Date of Patent: Dec. 4, 1990

[54] FROZEN DESSERT MIXING MACHINE

[76] Inventors: Kenneth E. Heinhold, 3015 Chancer Pl., Salt Lake City, Utah 84108; Duane H. Heinhold, 412 W. 2300 South, Bountiful, Utah 84010

[21] Appl. No.: 215,820

[22] Filed: Jul. 6, 1988

[51] Int. Cl.$^5$ .................... A23G 9/00; B01F 7/24
[52] U.S. Cl. .................... 366/289; 62/342; 99/455; 366/318; 366/331; 366/332; 366/344
[58] Field of Search .................... 99/452, 453–455, 99/460, 466, 348, 494, 516, 517; 366/140, 144, 149, 194–197, 199, 206, 331, 247, 332, 279, 289, 318, 323, , 347, 344; 241/282.1; 426/518, 519; 425/206, 208, 135, 185; 222/413; 62/342

[56] References Cited

U.S. PATENT DOCUMENTS

| | | |
|---|---|---|
| 2,626,132 | 1/1953 | Reed . |
| 2,626,133 | 1/1953 | Reed . |
| 3,061,279 | 10/1962 | Reed . |
| 4,448,114 | 5/1984 | Mayer . |
| 4,506,988 | 3/1985 | Reed . |
| 4,548,508 | 10/1985 | Verkler . |
| 4,590,851 | 5/1986 | Mayer .................... 99/455 |
| 4,590,852 | 5/1986 | Mayer et al. .................... 99/452 |
| 4,637,221 | 1/1987 | Levine . |
| 4,647,214 | 3/1987 | Kibby . |
| 4,671,172 | 6/1987 | Stiglich .................... 99/460 |
| 4,693,611 | 9/1987 | Verkler . |
| 4,708,489 | 11/1987 | Carlson . |
| 4,740,088 | 4/1988 | Kelly, Jr. .................... 366/318 |
| 4,755,060 | 7/1988 | Pederson .................... 366/286 |

Primary Examiner—Timothy F. Simone
Attorney, Agent, or Firm—Thorpe, North & Western

[57] ABSTRACT

Improvements are provided in machines for processing frozen comestibles of the type in which a frozen comestible is placed in a mixing cup and the mixing cup is moved toward an auger which mixes the frozen comestible into a smooth, soft material. The improvements comprise a chain driven drive for moving the mixing cup toward the auger. Further improvement include spring biased mounting means for mounting the auger of the machine to the drive shaft of the machine. An additional improvement comprises means for circulating cooled air from a freezer located adjacent to the mixing machine through the housing of the mixing machine to cool the mixing cup and the auger.

36 Claims, 7 Drawing Sheets

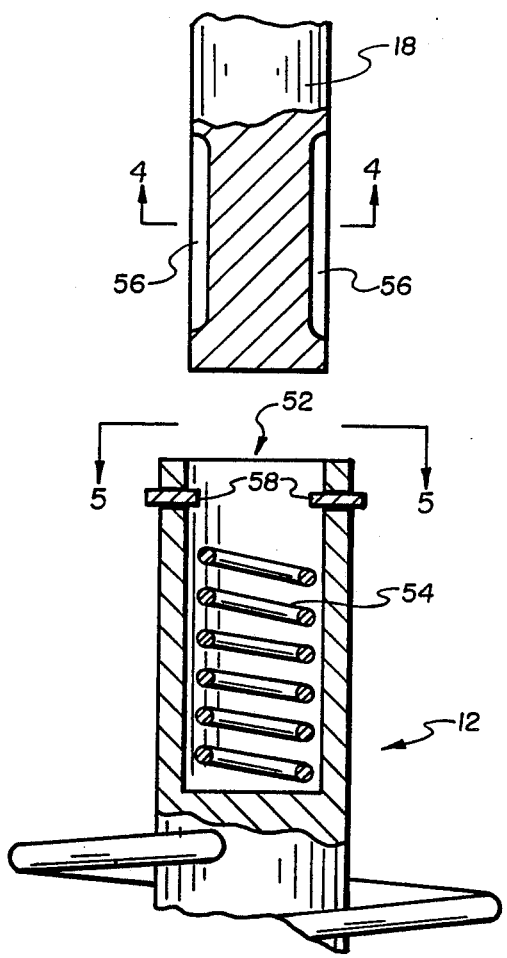
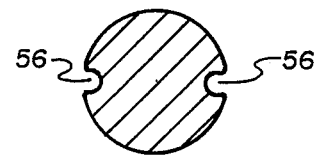
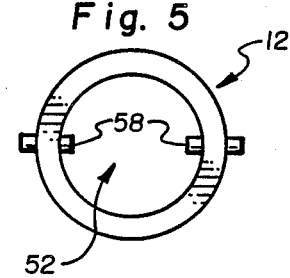
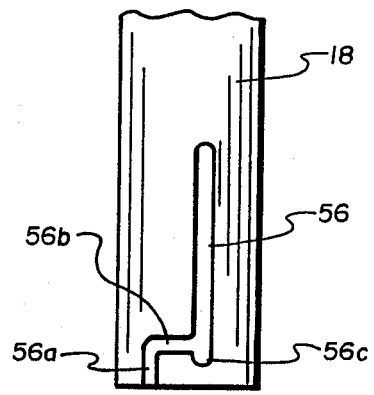

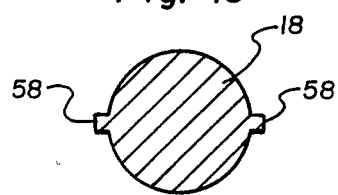
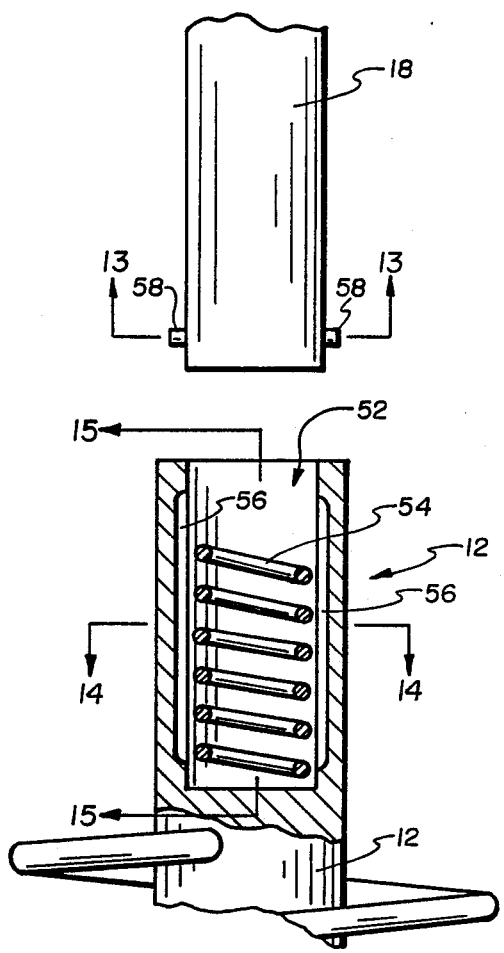
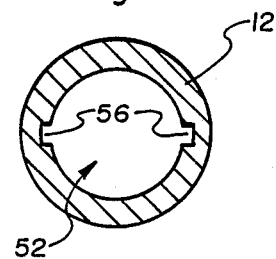
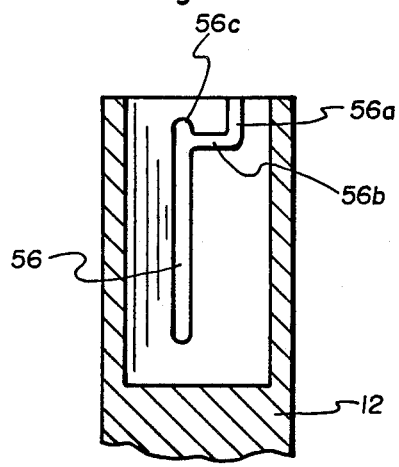

FROZEN DESSERT MIXING MACHINE

BACKGROUND OF THE INVENTION

1. Field of the Invention

The present invention relates to machines for mixing a frozen dessert in which various condiments and flavors are mixed in a given portion of a frozen material such as ice cream. In particular, the invention relates to improvements in the drive means for moving the mixing cone toward the mixing auger of such machines, and further to improvements in mounting the mixing auger to the motor driven drive of such machines.

2. State of the Art

Machines are well known in the prior art for mixing and transforming a hard frozen ice cream product to a substantially soft, smooth, creamy product which is superior in quality to conventional soft ice creams. In such machines, a variety of condiments such as pieces of candy, fruit, nuts, cookies and other flavors can be rapidly mixed with the ice cream in single serve portions.

As a result of a search of the relevant prior U.S. patents, the following patents were found which relate to machines of the type to which the present invention pertains:

| | |
|---|---|
| 2,626,132 | 4,548,508 |
| 2,626,133 | 4,637,221 |
| 3,061,279 | 4,647,214 |
| 4,448,114 | 4,693,611 |
| 4,506,988 | 4,708,489 |

3. Objectives

A principal objective of the present invention is to provide an improved, reliable drive mechanism for moving the mixing cone in a linear movement toward the auger of a frozen dessert mixing machine, wherein the improved drive mechanism is simple in construction yet rugged and efficient in use.

An additional objective of the present invention is to provide an improved mounting mechanism for mounting the auger to the drive means of a frozen dessert mixing machine, wherein the auger can momentarily move away from the mixing cone to absorb shock when the auger contacts solid items in the ice cream mixture being mixed.

A further objective of the present invention is to provide a means of circulating refrigerated air from a freezer located adjacent to the frozen dessert mixing machine to circulate about the auger and mixing cone of the mixing machine such that the auger and mixing cone will be maintained in a cold, operative condition.

BRIEF DESCRIPTION OF THE INVENTION

The above objectives are achieved in accordance with the present invention by providing novel improvements to the conventional machines for mixing a frozen dessert of the prior art. Because the basic mixing machines are well documented in the prior art, detailed description of the machines will not be repeated in this specification. For purposes of detailed descriptions of the basic mixing machines, the reader is referred to the prior art patents listed above, and the subject matter of these patents is included in this disclosure by reference.

In accordance with the present invention, an improved drive means is provided for moving the mixing cone of a conventional mixing machine in linear movement toward the auger of the mixing machine. The improved drive means comprises a carriage upon which the mixing cone is mounted. The carriage is, in turn, mounted on a generally vertically disposed track for linear, reciprocating movement toward and away from the auger of the machine. A lever actuated gear mechanism is provided having a drive sprocket which is driven in rotational motion upon pivotal movement of the lever. An upper idler sprocket is positioned above the auger of the mixing machine, and a drive chain extends from the carriage around the upper idler sprocket to the drive sprocket. When the lever of the gear mechanism is moved in a pivotal movement, the drive sprocket is driven in a rotational movement such that the drive chain moves the carriage and the mixing cone mounted thereon in linear movement toward the auger.

In a further embodiment of the invention, improved mounting means are provided for mounting the auger of the mixing machine to a conventional motor driven drive. The auger is received on the drive shaft in an axial, bayonet arrangement. A hollow, elongate bore is provided in either the auger or the drive shaft, with the drive shaft either being adapted to be received within the bore of the auger or a shaft-like extension on the auger is adapted to be received within the bore of the drive shaft. A spring is mounted within the bore to provide spring force between the drive shaft and the auger. The auger and drive shaft are, in turn, interconnected by means such that the auger is firmly mounted to the drive shaft, but is free to move to and fro with respect to the drive shaft against the spring force. The spring is totally isolated from the mixing environment of the auger and therefor requires no cleaning or maintenance.

In a still further embodiment of the invention, means are provided for establishing air circulation between the housing of the mixing machine and a freezer, such as used in the storage of ice cream, when the mixing machine is positioned adjacent to or over the freezer. A fan is provided which draws cool air from the freezer, circulates the cool air about the auger and mixing cone of the mixing machine, and then exhausts the circulated, cooled air from the housing of the mixing machine.

Additional objects and features of the invention will become apparent from the following detailed description, taken together with the accompanying drawings.

THE DRAWINGS

Preferred embodiments of the present invention representing the best modes presently contemplated of carrying out the invention are illustrated in the accompanying drawings in which:

FIG. 3 is an exploded, partial side view of a preferred embodiment of an improved interconnection between the drive shaft and the auger of the machine, with the upper portion of the auger and the lower portion of the drive shaft shown in cross section to show internal detail;

FIG. 4 is a cross section of the drive shaft of FIG. 3 taken along line 4—4 of that figure;

FIG. 5 is a top view, taken along line 5—5 of FIG. 4, of the upper end of the auger, with the spring removed;

FIG. 6 is a side view of the lower end portion of the drive shaft of FIG. 3 looking from the right hand side of FIG. 3;

FIG. 12 is an exploded, partial side view of a preferred embodiment similar to that of FIG. 3 of an improved interconnection between the drive shaft and the auger of the machine, with the upper portion of the auger shown in cross section to show, internal detail;

FIG. 13 is a cross section of the drive shaft of FIG. 12 taken along line 13—13 of that figure;

FIG. 14 is a cross section taken along line 14—14 of FIG. 12, with the spring removed;

FIG. 15 is a cross section taken along line 15—15 of FIG. 12, with the spring removed;

DETAILED DESCRIPTION OF THE ILLUSTRATED EMBODIMENTS

Figure 1:
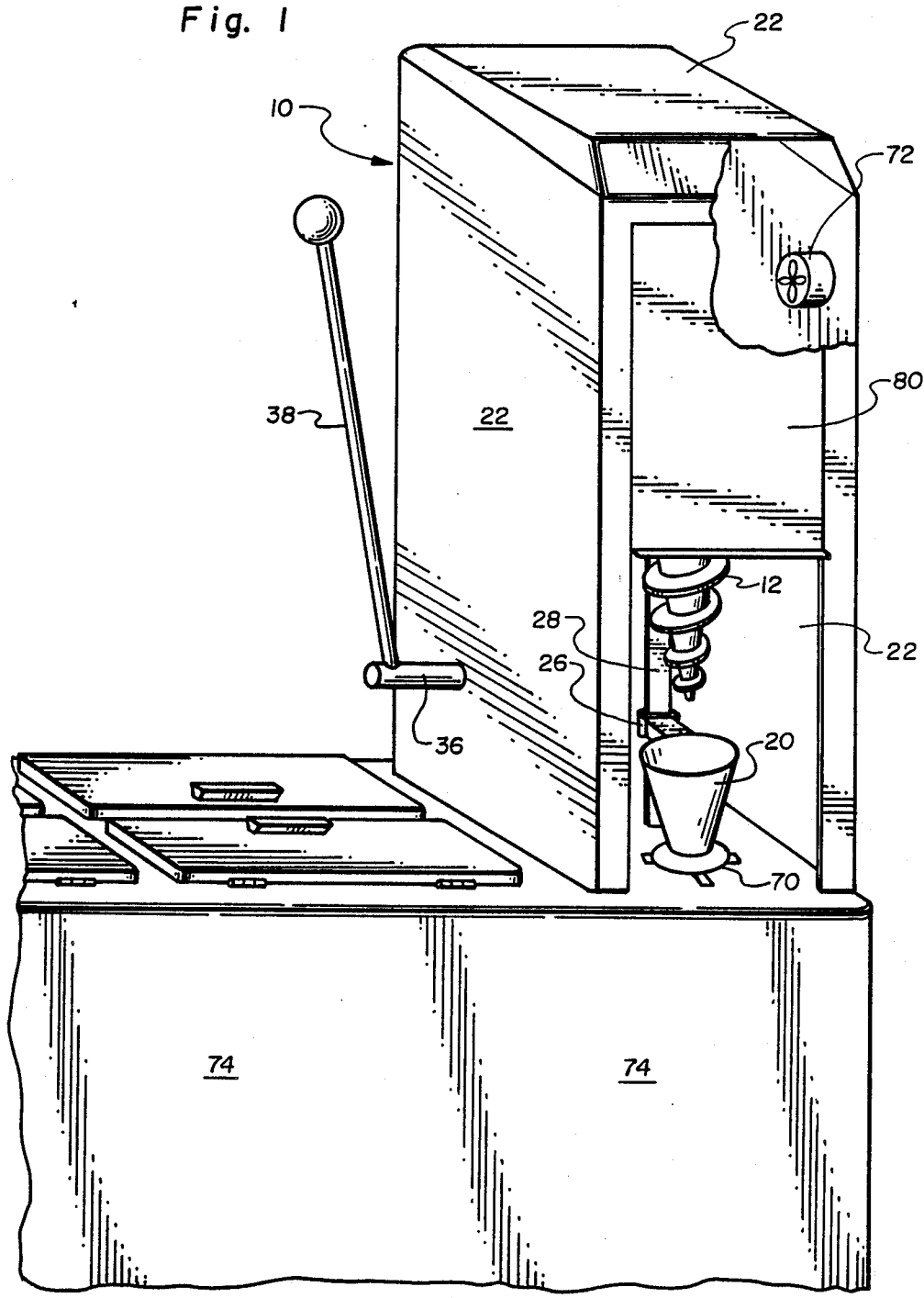
FIG. 1 is a pictorial representation of a mixing machine of the present invention showing the machine mounted upon the upper surface of a conventional freezer used in the storage of hard frozen comestibles.
Figure 2:
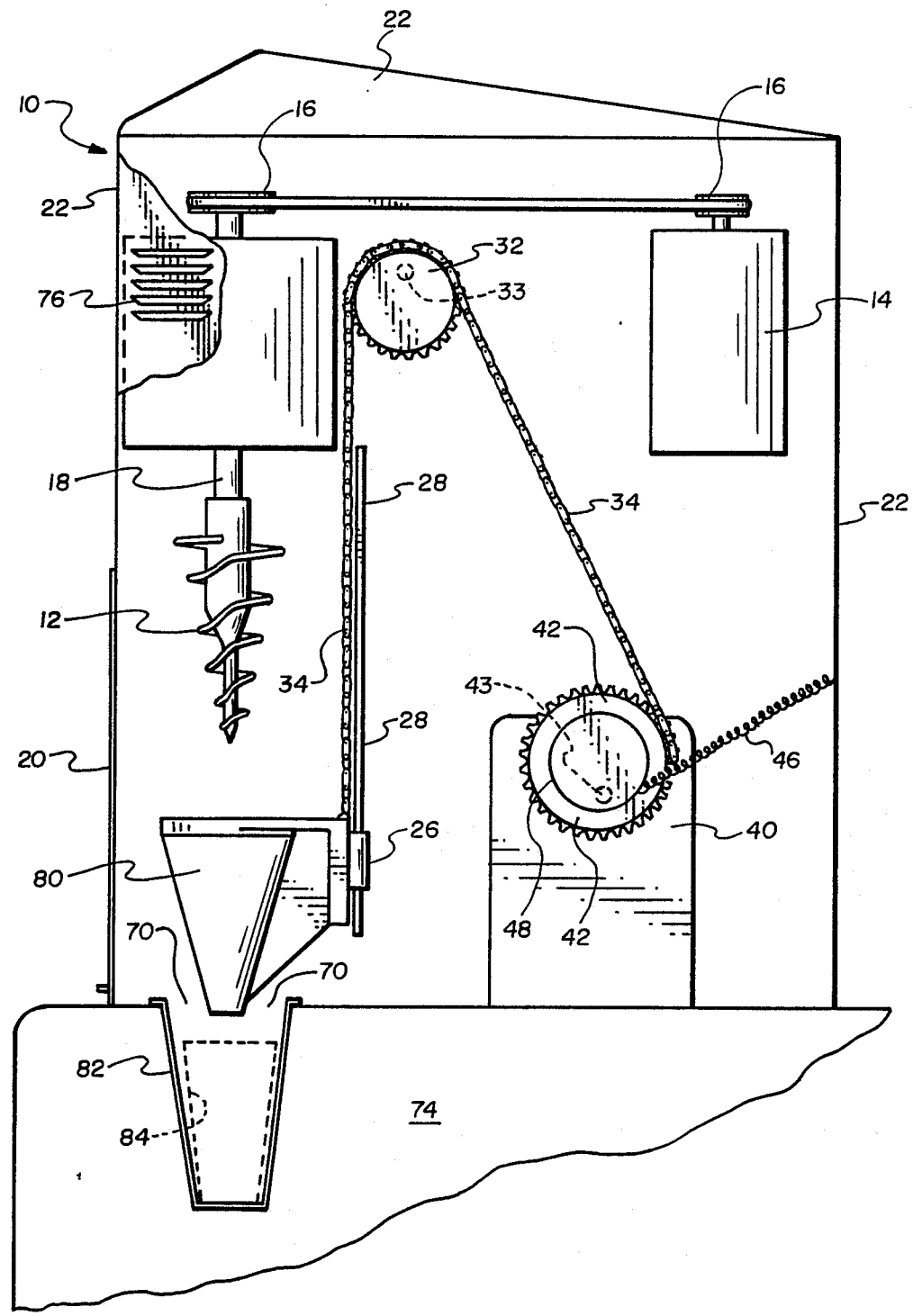
FIG. 2 is a side view of a mixing machine similar to that of FIG. 1 with the side of the housing of the mixing machine removed to illustrate working components within the housing.

Referring in particular to FIGS. 1 and 2 of the drawings, two related embodiments of a frozen comestible mixing device 10 in accordance with the present invention are shown. The apparatus 10 includes a mixing auger 12 and a motor 14, pulley system 16 and drive shaft 18 for driving the auger 12. A mixing cone 20 is provided in coaxial alignment with the mixing auger 12, and a housing 22 is provided for the apparatus. The apparatus, including the auger 12, the motor 14, pulley system 16, drive shaft 18, mixing cone 20 and housing 22, is conventional and well known in the prior art. The prior art as referred to hereinbefore gives a full and complete description of the general makeup and operation of such mixing apparatus. Thus, the description given further hereinafter will be directed to the novel improvements in accordance with the present invention.

Figure 9:
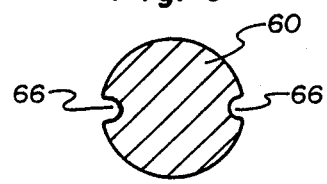
FIG. 9 is a cross section of the auger of FIG. 7 taken along the line 9—9 of that figure.
Figure 11:
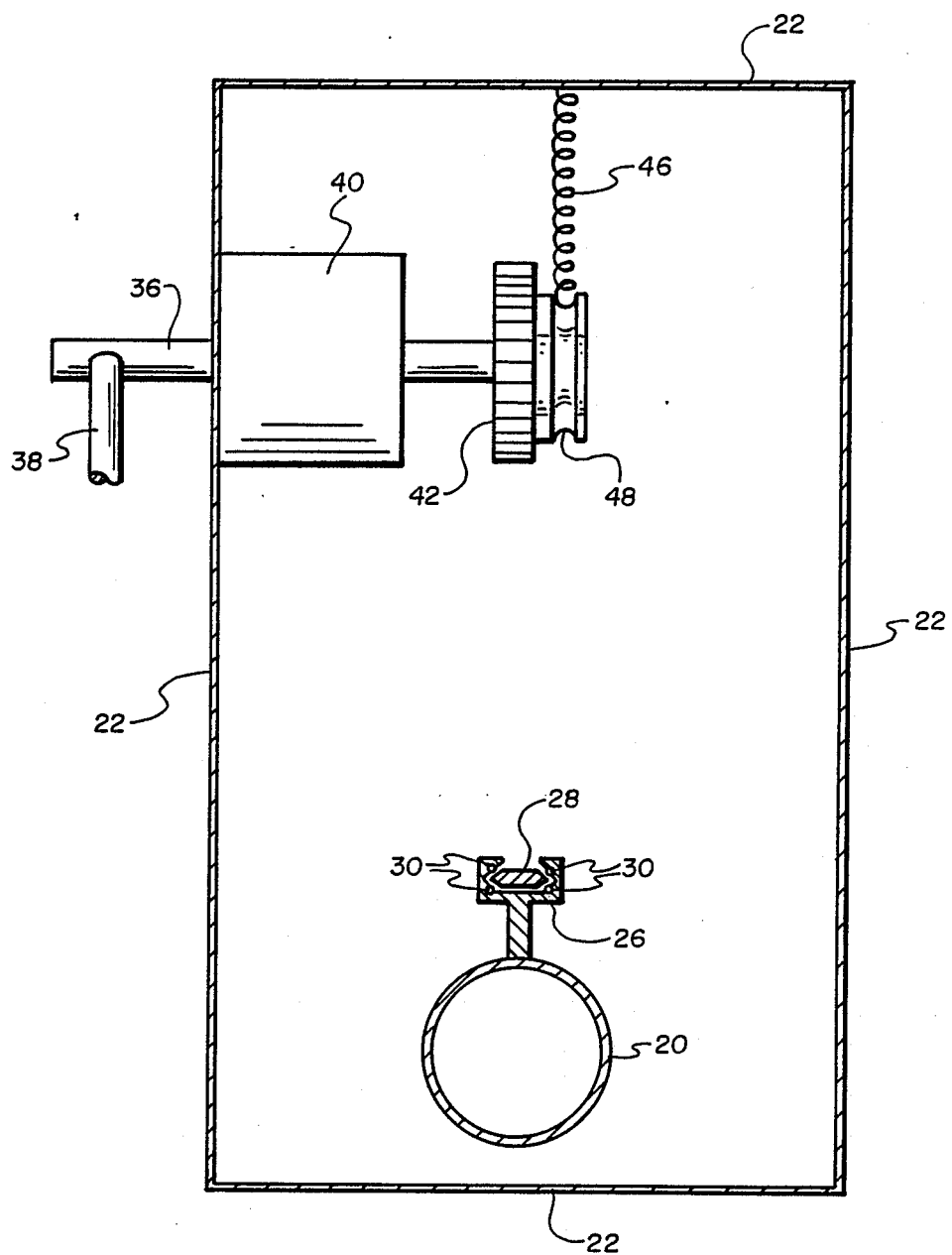
FIG. 11 is a cross section through the machine of FIG. 2 taken along line 11—11 of that figure.

In one improved embodiment of the present invention as best illustrated in FIGS. 1, 2 and 9, there is provided an improved drive means for moving the mixing cone 20 in linear movement toward the auger 12. The improved drive means comprises a single carriage 26 upon which the mixing cone 20 is mounted. The carriage 26 is attached to a single vertical support post for sliding movement therealong. As illustrated, the carriage 26 is movably mounted on a rigid, elongate track 28 for linear, reciprocating movement toward and away from the auger 12. The carriage 26 is designed to move along the track 28 with a minimum of frictional resistance. To this end, as illustrated in FIG. 11, it is advantageous to provide a track 28 having parallel, spaced side edges which form a race for ball bearings 30 mounted within the carriage 26.

A gear mechanism 40 is provided within the housing 22, with the drive shaft 36 of the gear mechanism 40 extending from the gear mechanism 40 through a side wall of the housing 22. A lever 38 in turn extends from the drive shaft 36 to be positioned adjacent to but spaced slightly from the side of the housing 22 such that the lever can be moved in a pivotal movement about the drive shaft 36. The gear mechanism 40 further has an output drive sprocket 42 which is driven in rotational motion upon pivotal movement of the lever 38.

An upper idler sprocket 32 is positioned above the auger 12 and generally in line with the longitudinal length of the track 28. A drive chain 34 is connected at one end to the carriage 26, with the drive chain 34 extending from the carriage 26 around the upper idler sprocket 32 to the drive sprocket 42 of the gear mechanism 40. When the lever 38 of the gear mechanism 40 is moved downwardly in a first pivotal movement, the drive chain 34 wraps about the drive sprocket 42 so as to move the carriage 26 and the mixing cone 20 mounted thereon in linear movement toward the auger 12.

In a particularly preferred, illustrated embodiment of the frozen dessert mixing machine in accordance with the present invention, either the drive sprocket 42 or the idler sprocket 32 is an eccentric sprocket which is rotated by the gear mechanism 40 about a rotational axis which is displaced from the respective center of either the drive sprocket 42 or the idler sprocket 32. Displaced rotational axes 33 for the idler sprocket 32 and 43 for the drive sprocket 42 are shown in FIG. 2 of the drawings. Although FIG. 2 shows both the idler sprocket 32 and the drive sprocket 42 having displaced rotational axes, one or the other of the sprockets may have a conventional, non-displaced rotational axis. When employing such an eccentric sprocket, the linear movement of the carriage 26 per unit pivotal movement of the lever 38 is greatest during the initial movement of the lever 38 and gradually decreases as the lever 38 continues to move through its pivotal movement. Thus, during the initial movement of the lever, the mixing cone 20 moves toward the auger 12 at a relative fast rate. As the mixing cone 20 approaches the auger 12, its rate of movement slows and an increase in mechanical advantage provides greater force for the final approach of the mixing cone 20 to the auger 12.

To aid in the return of the mixing cone 20 to its initial position following the use of the apparatus, a spring biasing means is advantageously provided in association with the carriage 26, drive chain 34 and lever actuated gear mechanism 40. The spring biasing means acts to resist the first pivotal movement of the lever 38 and to return the lever 38 to its initial position in a second pivotal movement following termination of the first pivotal movement. The spring biasing means preferably comprises an elongate coil spring 46 attached at one of its ends to the drive sprocket 42 and at its other end to a rigid support such as the housing 22. A guide track 48 (FIG. 9) is provided on the drive sprocket 42 upon which the coil spring 46 winds as the lever 38 moves in its first pivotal movement. Upon termination of the first pivotal movement of the lever 38, the tension in the spring 46 returns the lever 38 to its initial position.

In another preferred embodiment of the frozen dessert mixing machine of the present invention, there is further provided improved spring biased mounting means for mounting the auger 12 to the motor driven drive shaft 18 of the apparatus. The improved spring biased mounting means, as shown in FIGS. 3-6, advantageously comprises a hollow, elongate opening 52 extending coaxially inward from the end of the auger 12. The hollow, elongate opening 52 has a diameter such that the end of the drive shaft 18 can be received therein for axial, telescopic movement therewithin. A spring 54 is mounted within the hollow, elongate opening 52 to provide spring force against the end of the drive shaft 18 when the drive shaft 18 is inserted within the hollow, elongate opening 52. The end of the drive shaft 18 is maintained within the hollow, elongate opening 52 such that the end of the drive shaft 18 can move to and fro within the hollow, elongate opening 52.

Means for mounting the end of the drive shaft 18 within the hollow, elongate opening 52 advantageously comprises a pair of elongate grooves 56 in the diametrically opposite sides of the drive shaft 18. As shown in FIGS. 3, 4, and 6, the grooves 56 extend essentially longitudinally inward from the otherwise free end of the drive shaft 18. A cooperating pair of pins 58 project outwardly from the diametrically opposite sides of the hollow, elongate opening 52 in the end of the auger 12. The pins 58 are adapted to be received within the grooves of the drive shaft 18 for sliding movement therealong.

The grooves 56 could extend straight from the end of the otherwise free end of the drive shaft 18, but there would be no positive means of retention of the auger 12 on the drive shaft 18. To provide an interlocking means for retaining the auger 12 on the drive shaft 18, the elongate grooves 56 in the drive shaft 18 each preferably comprises, as best shown in FIG. 6, an initial, relatively short section 56a extending inwardly from the otherwise free end of the drive shaft 18 substantially parallel with the longitudinal axis of the drive shaft 18. A second, relatively short section 56b of the grooves extends substantially circumferentially of the drive shaft 18, with the first end of the short section 56b opening to the inner end of the initial section 56a and with the second end of the short section 56b opening to the relatively long section of the groove 56. The long section of the groove 56 extends from the second end of the second section 56b in a direction away from the otherwise free end of the drive shaft 18. The long section of the groove 56 is substantially parallel with the longitudinal axis of the drive shaft 18.

In affixing the auger 12 to the drive shaft 18, the pins 58 of the auger 12 are aligned with and slid to the inner end of the initial, short sections 56a of the grooves. The auger 12 is then rotated so that the pins 58 slide through the second sections 56b of the grooves and become aligned with the longer portions of the groove 56. To further aid in retaining the auger 12 on the drive shaft 18, the second end of the second section 56b of each of the elongate grooves 56 in the drive shaft 18 is provided with a notch 56c which, as shown in FIG. 6, extends toward the otherwise free end of the drive shaft 18 and is in alignment with the longer section of each of the elongate grooves 56.

In yet another preferred embodiment of the frozen dessert mixing machine of the present invention, there is provided a modified embodiment of improved spring biased mounting means for mounting the auger 12 to the motor driven drive shaft 18 of the apparatus. The improved spring biased mounting means, as shown in FIGS. 7-10, advantageously comprises a hollow, elongate opening 62 extending coaxially inward from the end of the drive shaft 18. The hollow, elongate opening 62 has a diameter such that the end of a cylindrical mounting shaft 60 projecting from the upper end of the auger 12 can be received therein for axial, telescopic movement therewithin. A spring 64 is mounted within the hollow, elongate opening 62 to provide spring force against the end of the cylindrical mounting shaft 60 when the shaft 60 is inserted within the hollow, elongate opening 62. The end of the shaft 60 is maintained within the hollow, elongate opening 62 such that the end of the shaft 60 can move to and fro within the hollow, elongate opening 62.

Figure 7:
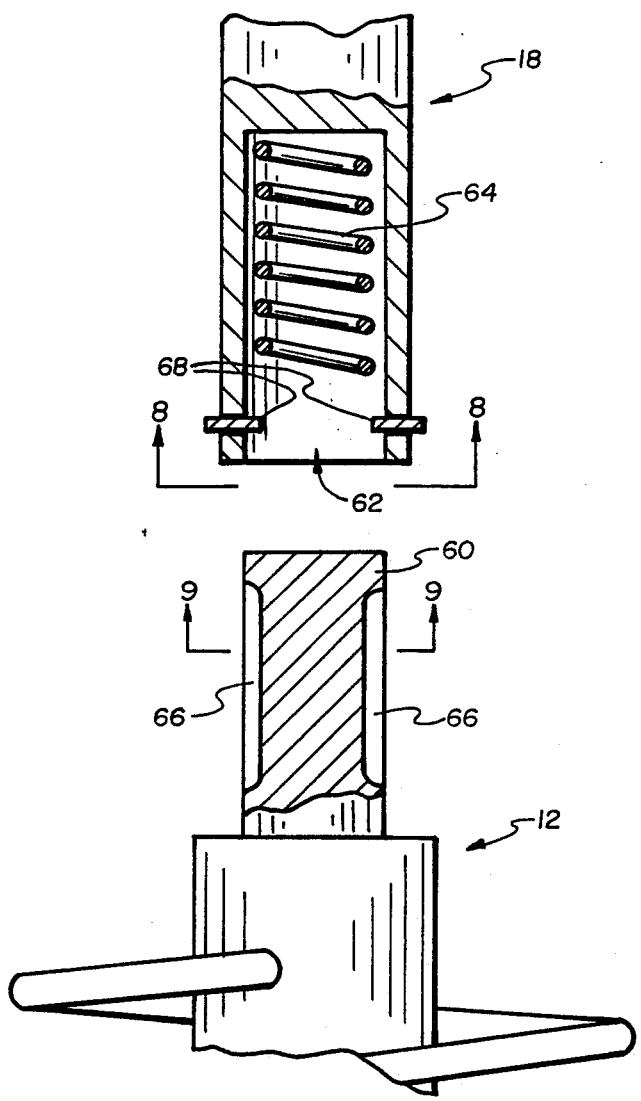
FIG. 7 is an exploded, partial side view of another preferred embodiment of an improved interconnection between the drive shaft and the auger of the machine, with the lower end portion of the drive shaft and the upper end portion of the auger being shown in cross section to show internal detail.
Figure 8:
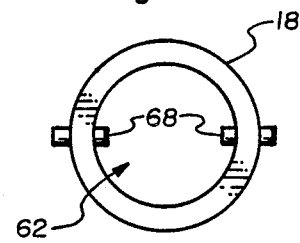
FIG. 8 is a bottom view, taken along line 8—8 of FIG. 7, of the lower end of the drive shaft, with the spring removed.
Figure 10:
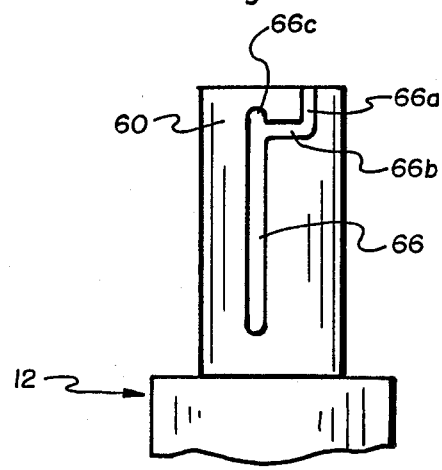
FIG. 10 is a side view of the upper end portion of the auger of FIG. 7 looking from the right hand side of FIG. 7.

Means for mounting the end of the mounting shaft 60 within the hollow, elongate opening 62 advantageously comprises a pair of elongate grooves 66 in the diametrically opposite sides of the mounting shaft 60. As shown in FIGS. 7, 9, and 10, the grooves 66 extend essentially longitudinally inward from the otherwise free end of the mounting shaft 60. A cooperating pair of pins 68 project outwardly from the diametrically opposite sides of the hollow, elongate opening 62 in the end of the drive shaft 18. The pins 68 are adapted to be received within the grooves of the mounting shaft 60 for sliding movement therealong.

The grooves 66 could extend straight from the end of the otherwise free end of the mounting shaft 60, but there would be no positive means of retention of the auger 12 on the drive shaft 18. To provide an interlocking means for retaining the auger 12 on the drive shaft 18, the elongate grooves 66 in the mounting shaft 60 each preferably comprises, as best shown in FIG. 10, an initial, relatively short section 66a extending inwardly from the otherwise free end of the mounting shaft 60 substantially parallel with the longitudinal axis of the shaft 60. A second, relatively short section 66b of the grooves extends substantially circumferentially of the mounting shaft 60, with the first end of the short section 66a opening to the inner end of the initial section 66a and with the second end of the short section 66a opening to the relatively long section of the groove 66. The long section of the groove 66 extends from the second end of the second section 66b in a direction away from the otherwise free end of the mounting shaft 60. The long section of the groove 66 is substantially parallel with the longitudinal axis of the mounting shaft 60.

In affixing the auger 12 to the drive shaft 18, the pins 68 of the drive shaft 18 are aligned with and slid to the inner end of the initial, short sections 66a of the grooves in the mounting shaft 60. The auger 12 is then rotated so that the pins 68 slide through the second sections 66b of the grooves in the mounting shaft 60 and become aligned with the longer portions of the groove 66. To further aid in retaining the auger 12 on the drive shaft 18, the second end of the second section 66b of each of the elongate grooves 66 in the mounting shaft 60 is provided with a notch 66c which, as shown in FIG. 10, extends toward the otherwise free end of the mounting shaft 60 and is in alignment with the longer section of each of the elongate grooves 66.

A modified embodiment of the spring biased mounting means of FIGS. 3-6 is shown in FIGS. 12-15. As in the embodiment of FIGS. 3-6, the modified embodiment, as shown in FIGS. 12-15, comprises a hollow, elongate opening 52 extending coaxially inward from the end of the auger 12. The hollow, elongate opening 52 has a diameter such that the end of the drive shaft 18 can be received therein for axial, telescopic movement therewithin. A spring 54 is mounted within the hollow, elongate opening 52 to provide spring force against the end of the drive shaft 18 when the drive shaft 18 is inserted within the hollow, elongate opening 52. The end of the drive shaft 18 is maintained within the hollow, elongate opening 52 such that the end of the drive shaft 18 can move to and fro within the hollow, elongate opening 52.

Means for mounting the end of the drive shaft 18 within the hollow, elongate opening 52 advantageously comprises a pair of elongate grooves 56 in the diametrically opposite sides of the hollow opening 52. As shown in FIGS. 12, 14, and 15, the grooves 56 extend essentially longitudinally inward from the open end of the hollow, elongate opening 52. A cooperating pair of pins 58 project outwardly from the diametrically opposite sides of the drive shaft 18. The pins 58 are adapted to be received within the grooves 56 of the hollow, elongate opening 52 for sliding movement therealong.

The grooves 56 could extend straight from the open end of the hollow, elongate opening 52, but there would be no positive means of retention of the auger 12 on the drive shaft 18. To provide an interlocking means for retaining the auger 12 on the drive shaft 18, the elongate grooves 56 in the hollow, elongate opening 52 each preferably comprises, as best shown in FIG. 15, an initial, relatively short section 56a extending inwardly from the otherwise open end of the hollow, elongate opening 52 substantially parallel with the longitudinal axis of the elongate opening 52. A second, relatively short section 56b of the grooves extends substantially circumferentially of the elongate opening 52, with the first end of the short section 56b opening to the inner end of the initial section 56a and with the second end of the short section 56b opening to the relatively long section of the groove 56. The long section of the groove 56 extends from the second end of the second section 56b in a direction away from the open end of the elongate opening 52. The long section of the groove 56 is substantially parallel with the longitudinal axis of the elongate opening 52.

In affixing the auger 12 to the drive shaft 18, the pins 58 of the drive shaft 18 are aligned with and slid to the inner end of the initial, short sections 56a of the grooves. The auger 12 is then rotated so that the pins 58 slide through the second sections 56b of the grooves and become aligned with the longer portions of the groove 56. To further aid in retaining the auger 12 on the drive shaft 18, the second end of the second section 56b of each of the elongate grooves 56 in the elongate opening 52 is provided with a notch 56c which, as shown in FIG. 15, extends toward the open end of the elongate opening 52 and is in alignment with the longer section of each of the elongate grooves 56.

A modified embodiment of the spring biased mounting means of FIGS. 7-10 is shown in FIGS. 16-19. As in the embodiment of FIGS. 7-10, the modified embodiment, as shown in FIGS. 16-19, comprises a hollow, elongate opening 62 extending coaxially inward from the end of the drive shaft 18. The hollow, elongate opening 62 has a diameter such that the end of a cylindrical mounting shaft 60 projecting from the upper end of the auger 12 can be received therein for axial, telescopic movement therewithin. A spring 64 is mounted within the hollow, elongate opening 62 to provide spring force against the end of the cylindrical mounting shaft 60 when the shaft 60 is inserted within the hollow, elongate opening 62. The end of the shaft 60 is maintained within the hollow, elongate opening 62 such that the end of the shaft 60 can move to and fro within the hollow, elongate opening 62.

Figure 16:
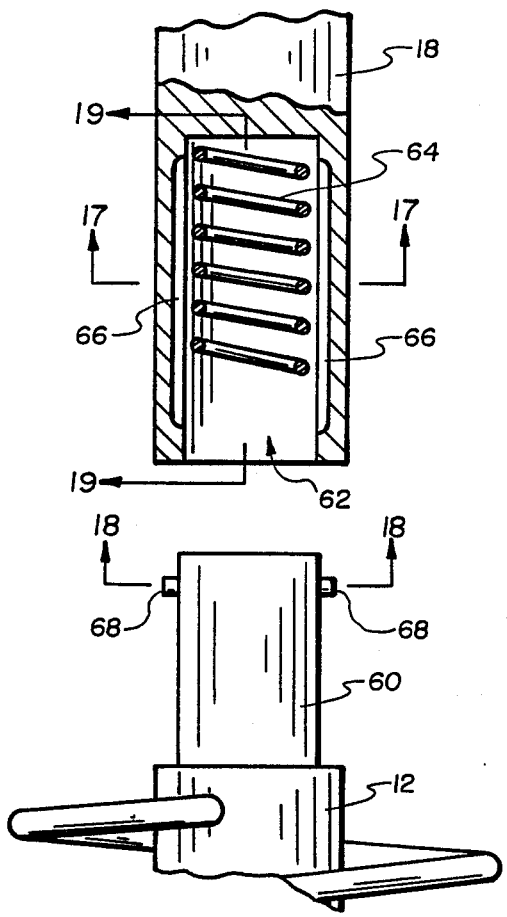
FIG. 16 is an exploded, partial side view of a preferred embodiment similar to that of FIG. 7 of an improved interconnection between the drive shaft and the auger of the machine, with the upper portion of the drive shaft shown in cross section to show internal detail.
Figure 17:
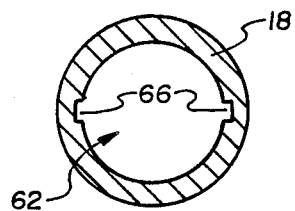
FIG. 17 is a cross section of the drive shaft of FIG. 16 taken along line 17—17 of that figure, with the spring removed.
Figure 18:
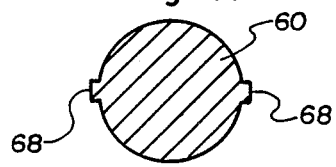
FIG. 18 is a cross section taken along line 18—18 of FIG. 16.
Figure 19:
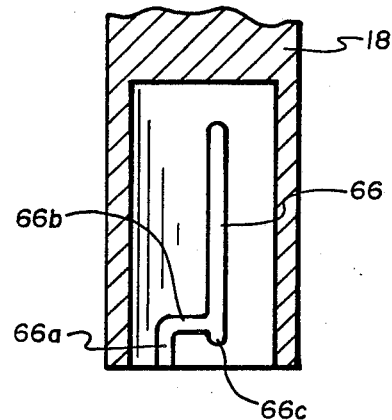
FIG. 19 is a cross section taken along line 19—19 of FIG. 16, with the spring removed

Means for mounting the end of the mounting shaft 60 within the hollow, elongate opening 62 advantageously comprises a pair of elongate grooves 66 in the diametrically opposite sides of the hollow, elongate opening 62. As shown in FIGS. 16, 18, and 19, the grooves 66 extend essentially longitudinally inward from the open end of the hollow, elongate opening 62. A cooperating pair of pins 68 project outwardly from the diametrically opposite sides of the mounting shaft 60. The pins 68 are adapted to be received within the grooves 66 of the hollow, elongate opening 62 for sliding movement therealong.

The grooves 66 could extend straight from the open end of the hollow, elongate opening 62, but there would be no positive means of retention of the auger 12 on the drive shaft 18. To provide an interlocking means for retaining the auger 12 on the drive shaft 18, the elongate grooves 66 in the hollow, elongate opening 62 each preferably comprises, as best shown in FIG. 19, an initial, relatively short section 66a extending inwardly from the open end of the hollow, elongate opening 62 substantially parallel with the longitudinal axis of the elongate opening 62. A second, relatively short section 66b of the grooves extends substantially circumferentially of the hollow, elongate opening 62, with the first end of the short section 66b opening to the inner end of the initial section 66a and with the second end of the short section 66b opening to the relatively long section of the groove 66. The long section of the groove 66 extends from the second end of the second section 66b in a direction away from the open end of the hollow, elongate opening 62. The long section of the groove 66 is substantially parallel with the longitudinal axis of the hollow, elongate opening 62.

In affixing the auger 12 to the drive shaft 18, the pins 68 of the mounting shaft 60 are aligned with and slid to the inner end of the initial, short sections 66a of the grooves in the elongate opening 62. The auger 12 is then rotated so that the pins 68 slide through the second sections 66b of the grooves and become aligned with the longer portions of the groove 66. To further aid in retaining the auger 12 on the drive shaft 18, the second end of the second section 66b of each of the elongate grooves 66 in the hollow, elongate opening 62 is provided with a notch 66c which, as shown in FIG. 19, extends toward the open end of the hollow, elongate opening 62 and is in alignment with the longer section of each of the elongate grooves 66.

Another advantageous feature of the improved mixing machine of the present invention comprises novel means for withdrawing cooled air from a freezer and circulating the cooled air about the auger 12 and mixing cone 20. The cool air maintains the auger 12 and mixing cone 20 in a cooled condition such that unnecessary melting of the frozen dessert does not result during an initial use of the machine following a substantial period (such as 5 to 10 minutes or more) of nonuse.

The novel means for achieving cooling of the auger 12 and mixing cone 20 comprises a first opening 70 in the housing 22 which communicates with a refrigerated compartment of a freezer when the housing is placed adjacent to the freezer. As shown in FIGS. 2 and 11, the machine of the present invention advantageously sets on top of a conventional freezer 74 used to store hard frozen ice cream. The first opening 70 in the housing 22 comprises a cylindrical passage opening downwardly into the freezer compartment from the bottom of the housing 22.

A second opening 76 is provided in the housing 22. As illustrated in FIG. 1, the second opening 76 comprises a plurality of perforations in the upper wall of one of the sides of the housing 22. A fan 72 (FIG. 1) is associated with the housing and is adapted to (a) draw cooling air from the refrigerated compartment of the freezer 74 through the first opening 70 in the housing 22, (b) circulating the cooled air about the auger 12 and mixing cone 20 within the housing 22 and (c) exhausting the circulated, cooled air from the housing through the second opening 76 in the housing 22.

As shown in FIGS. 1 and 2, a sliding door 80 can be provided as is known in the art at the front of the housing 22 for access to the mixing cup 20 and auger 12. The door aids in keeping the interior of the machine clean when not in use as well as containing the circulating cool air flowing through the housing 22 between uses of the machine.

As shown in FIG. 2, a receptacle 82 is advantageously positioned immediately below the mixing cone 20 to collect excess, waste material from the cone 20. The receptacle 82 is preferably mounted within the opening 70. The receptacle 82, as illustrated, comprises a bottom member and side strips which extend upwardly through the opening 70, with the strips being adapted to hang on the lip of the opening 70. The receptacle 82 is thus open so as to allow flow of cooling air from the freezer 74 into the housing 22. The receptacle is easily lifted upwardly from the opening 70 and removed from the housing 22 for cleaning purposes without moving the housing 22 from the freezer 74. A paper cup 84 can be placed in the receptacle 82 to collect the waste material for easy disposal.

Although preferred embodiments of the mixing machine of the present invention have been illustrated and described, it is to be understood that the present disclosure is made by way of example and that various other embodiments are possible without departing from the subject matter coming within the scope of the following claims, which subject matter is regarded as the invention.

We claim:

1. In a frozen dessert mixing machine including a mixing auger, a motor driven drive for driving the auger, and a mixing cone in coaxial alignment with the mixing auger, improved drive means for moving the mixing cone in linear movement toward said auger, said improved drive means comprising a carriage upon which said mixing cone is mounted;

a track on which said carriage is movably mounted for linear, reciprocating movement toward and away from said auger;

a layer activated gear mechanism having a drive sprocket which is driven in rotational motion upon pivotal movement of the lever;

an upper idler sprocket positioned above said auger;

said drive sprocket or said idler sprocket is an eccentric sprocket which rotates about a rotational axis which is displaced from the center of such respective sprocket; and a drive chain connected at one end to said carriage, with said drive chain extending from the carriage around the upper idler sprocket to the drive sprocket;

wherein when the lever of said gear mechanism is moved in a first pivotal movement, the drive sprocket is driven in a rotational movement such that the drive chain moves said carriage and the mixing cone mounted thereon in linear movement toward said auger, with the linear movement of the carriage per unit pivotal movement of said lever being greatest during the initial movement of said lever and gradually decreasing as the lever continues to move through its pivotal movement.

2. The improvement in a frozen dessert mixing machine in accordance with claim 1, wherein either said drive sprocket or said idler sprocket is an eccentric sprocket which is rotated by said gear mechanism about a rotational axis which is displaced from the center of such respective sprocket, whereby the linear movement of the carriage per unit pivotal movement of said lever is greatest during the initial movement of said lever and gradually decreases as the lever continues to move through its pivotal movement.

3. The improvement in a frozen dessert mixing machine in accordance with claim 1, wherein spring biasing means are provided in association with said carriage, drive chain and lever actuated gear mechanism, with the spring biasing means acting to resist the first pivotal movement of said lever and to return the lever to its initial position in a second pivotal movement following termination of said first pivotal movement.

4. The improvement in a frozen dessert mixing machine in accordance with claim 3, wherein said spring biasing means comprises an elongate coil spring attached at one of its ends to said drive sprocket; and a guide track on said drive sprocket upon which the coil spring winds as said lever moves in its first pivotal movement.

5. The improvement in a frozen dessert mixing machine in accordance with claim 1, wherein there is further provided improved spring biased mounting means for mounting said auger to said motor driven drive, said improved spring biased mounting means comprising a drive shaft associated with said motor driven drive;

a hollow, elongate opening extending coaxially inward from the end of said auger, said hollow, elongate opening having a diameter such that the end of said drive shaft can be received therein for axial, telescopic movement therewithin;

a spring mounted within said hollow, elongate opening to provide spring force against the end of said drive shaft when said drive shaft is inserted within said hollow, elongate opening; and second mounting means for mounting the end of said drive shaft within said hollow, elongate opening such that the end of said drive shaft can move to and fro within said hollow, elongate opening.

6. The improvement in a frozen dessert mixing machine in accordance with claim 5, wherein said second mounting means comprises a pair of elongate grooves in the side of said drive shaft, extending longitudinally inward from the otherwise free end of said drive shaft; and a pair of pins projecting outwardly from the hollow, elongate opening, whereby said pins extending from said hollow, elongate opening are received within the grooves of said drive shaft for sliding movement therealong.

7. The improvement in a frozen dessert mixing machine in accordance with claim 6, wherein each of the elongate grooves in said drive shaft comprises an initial, relatively short section extending inwardly from the otherwise free end of said drive shaft substantially parallel with the longitudinal axis of said drive shaft;

a second, relatively short section having first and second ends, said second section extending substantially circumferentially of said drive shaft, with the first end opening to the inner end of said initial section; and a third, relatively long section extending from the second end of said second section in a direction away from the otherwise free end of said drive shaft, said third section being substantially parallel with the longitudinal axis of said drive shaft.

8. The improvement in a frozen dessert mixing machine in accordance with claim 7, wherein the second end of said second section of each of the elongate grooves in said drive shaft is provided with a notch which extends toward the otherwise free end of said drive shaft and in alignment with said third section of each of said elongate grooves.

9. The improvement in a frozen dessert mixing machine in accordance with claim 5, wherein said second mounting means comprises a pair of elongate grooves in the side of said elongate opening in said auger, said pair of grooves extending along the side of said elongate opening from the open end of said elongate opening; and a pair of pins projecting outwardly from the drive shaft, whereby said pins on said drive shaft are received within the grooves of said elongate opening for sliding movement therealong.

10. The improvement in a frozen dessert mixing machine in accordance with claim 9, wherein each of the elongate grooves in said elongate opening in said auger comprises an initial, relatively short section extending inwardly from the open end of said elongate opening substantially parallel with the longitudinal axis of said elongate opening;

a second, relatively short section having first and second ends, said second section extending substantially circumferentially of said elongate opening, with the first end opening to the inner end of said initial section; and a third, relatively long section extending from the second end of said second section in a direction away from the open end of said elongate opening, said third section being substantially parallel with the longitudinal axis of said elongate opening.

11. The improvement in a frozen dessert mixing machine in accordance with claim 10, wherein the second end of said second section of each of the elongate grooves in said elongate opening is provided with a notch which extends toward the open end of said elongate opening and in alignment with said third section of each of said elongate grooves.

12. The improvement in a frozen dessert mixing machine in accordance with claim 1, wherein there is further provided improved spring biased mounting means for mounting said auger to said motor driven drive, said improved spring biased mounting means comprising a drive shaft associated with said motor driven drive;

a cylindrical mounting shaft projecting from said mixing auger;

a hollow, elongate opening extending coaxially inward from the end of said drive shaft, said hollow, elongate opening having a diameter such that the cylindrical mounting shaft of said auger can be received therein for axial, telescopic movement therewithin;

a spring mounted within said hollow, elongate opening to provide spring force against the end of said cylindrical mounting shaft of said auger when said cylindrical mounting shaft is inserted within said hollow, elongate opening; and mounting means for mounting the end of said cylindrical mounting shaft of said auger within said hollow, elongate opening such that said cylindrical mounting shaft can move to and fro within said hollow, elongate opening.

13. The improvement in a frozen dessert mixing machine in accordance with claim 12, wherein said mounting means comprises a pair of elongate grooves in the side of said cylindrical mounting shaft of said auger, said pair of elongate grooves extending longitudinally inward from the otherwise free end of said cylindrical mounting shaft; and a pair of pins projecting outwardly from the hollow, elongate opening, whereby said pins extending from said hollow, elongate opening are received within the grooves of said cylindrical mounting shaft for sliding movement therealong.

14. The improvement in a frozen dessert mixing machine in accordance with claim 13, wherein each of the elongate grooves in said cylindrical mounting shaft of said auger comprises an initial, relatively short section extending inwardly from the otherwise free end of said cylindrical mounting shaft substantially parallel with the longitudinal axis of said cylindrical mounting shaft;

a second, relatively short section having first and second ends, said second section extending substantially circumferentially of said cylindrical mounting shaft, with the first end opening to the inner end of said initial section; and a third, relatively long section extending from the second end of said second section in a direction away from the otherwise free end of said cylindrical mounting shaft, said third section being substantially parallel with the longitudinal axis of said cylindrical mounting shaft.

15. The improvement in a frozen dessert mixing machine in accordance with claim 14, wherein the second end of said second section of each of the elongate grooves in said cylindrical mounting shaft of said auger is provided with a notch which extends toward the otherwise free end of said cylindrical mounting shaft and in alignment with said third section of each of said elongate grooves.

16. The improvement in a frozen dessert mixing machine in accordance with claim 12, wherein said mounting means comprises a pair of elongate grooves in the side of said elongate opening in said drive shaft, said pair of grooves extending along the side of said elongate opening from the open end of said elongate opening; and a pair of pins projecting outwardly from the cylindrical mounting shaft of said auger, whereby said pins on said cylindrical mounting shaft are received within the grooves of said elongate opening for sliding movement therealong.

17. The improvement in a frozen dessert mixing machine in accordance with claim 16, wherein each of the elongate grooves in said elongate opening in said drive shaft comprises an initial, relatively short section extending inwardly from the open end of said elongate opening substantially parallel with the longitudinal axis of said elongate opening;

a second, relatively short section having first and second ends, said second section extending substantially circumferentially of said elongate opening, with the first end opening to the inner end of said initial section; and a third, relatively long section extending from the second end of said second section in a direction away from the open end of said elongate opening, said third section being substantially parallel with the longitudinal axis of said elongate opening.

18. The improvement in a frozen dessert mixing machine in accordance with claim 17, wherein the second end of said second section of each of the elongate grooves in said elongate opening is provided with a notch which extends toward the open end of said elongate opening and in alignment with said third section of each of said elongate grooves.

19. The improvement in a frozen dessert mixing machine in accordance with claim 1, wherein there is further provided a housing to contain the mixing auger, the motor driven drive for driving the auger and the mixing cone;

a first opening in said housing which communicates with a refrigerated compartment of a freezer when said housing is placed adjacent to the freezer;

a second opening in said housing; and a fan associated with said housing for (a) drawing cooling air from the refrigerated compartment through said first opening in said housing, (b) circulating the cooled air about the auger and mixing cone within said housing and (c) exhausting the circulated, cooled air from said housing through said second opening in said housing.

20. The improvement in a frozen dessert mixing machine in accordance with claim 1, wherein said track consists of a single vertical support post having a single track means upon which said carriage is mounted.

21. In a frozen dessert mixing machine including a mixing auger, a motor driven drive for driving the auger, a mixing cone in coaxial alignment with the mixing auger, and drive means for moving the mixing cone in linear movement toward said auger, improved spring biased mounting means for mounting said auger to said motor driven drive, said improved spring biased mounting means comprising a hollow, elongate opening extending coaxially inward from the end of said auger;

a drive shaft received in said opening for axial, telescopic movement in said opening;

a spring mounted within said hollow, elongate opening to provide spring force against the end of said drive shaft when said drive shaft is inserted within said hollow, elongate opening; and second mounting means for mounting the auger to the end of said drive shaft such that the end of said drive shaft can move to and fro within said hollow, elongate opening.

22. The improvement in a frozen dessert mixing machine in accordance with claim 21, wherein said second mounting means comprises a pair of elongate grooves in the side of said drive shaft, extending longitudinally inward from the otherwise free end of said drive shaft; and a pair of pins projecting outwardly from the hollow, elongate opening, whereby said pins extending from said hollow, elongate opening are received within the grooves of said drive shaft for sliding movement therealong.

23. The improvement in a frozen dessert mixing machine in accordance with claim 22, wherein each of the elongate grooves in said drive shaft comprises an initial, relatively short section extending inwardly from the otherwise free end of said drive shaft substantially parallel with the longitudinal axis of said drive shaft;

a second, relatively short section having first and second ends, said second section extending substantially circumferentially of said drive shaft, with the first end opening to the inner end of said initial section; and a third, relatively long section extending from the second end of said second section in a direction away from the otherwise free end of said drive shaft, said third section being substantially parallel with the longitudinal axis of said drive shaft.

24. The improvement in a frozen dessert mixing machine in accordance with claim 23, wherein the second end of said second section of each of the elongate grooves in said drive shaft is provided with a notch which extends toward the otherwise free end of said drive shaft and in alignment with said third section of each of said elongate grooves.

25. The improvement in a frozen dessert mixing machine in accordance with claim 21, wherein said second mounting means comprises a pair of elongate grooves in the side of said elongate opening in said auger, said pair of grooves extending along the side of said elongate opening from the open end of said elongate opening; and a pair of pins projecting outwardly from the drive shaft, whereby said pins on said drive shaft are received within the grooves of said elongate opening for sliding movement therealong.

26. The improvement in a frozen dessert mixing machine in accordance with claim 25, wherein each of the elongate grooves in said elongate opening in said auger comprises an initial, relatively short section extending inwardly from the open end of said elongate opening substantially parallel with the longitudinal axis of said elongate opening;

a second, relatively short section having first and second ends, said second section extending substantially circumferentially of said elongate opening, with the first end opening to the inner end of said initial section; and a third, relatively long section extending from the second end of said second section in a direction away from the open end of said elongate opening, said third section being substantially parallel with the longitudinal axis of said elongate opening.

27. The improvement in a frozen dessert mixing machine in accordance with claim 26, wherein the second end of said second section of each of the elongate grooves in said elongate opening is provided with a notch which extends toward the open end of said elongate opening and in alignment with said third section of each of said elongate grooves.

28. The improvement in a frozen dessert mixing machine in accordance with claim 21, wherein there is further provided
a housing to contain the mixing auger, the motor driven drive for driving the auger and the mixing cone;
a first opening in said housing which communicates with a refrigerated compartment of a freezer when said housing is placed adjacent to the freezer;
a second opening in said housing; and
a fan associated with said housing for (a) drawing cooling air from the refrigerated compartment through said first opening in said housing, (b) circulating the cooled air about the auger and mixing cone within said housing and (c) exhausting the circulated, cooled air from said housing through said second opening in said housing.

29. In a frozen dessert mixing machine including a mixing auger having a cylindrical mounting shaft projecting therefrom, a motor driven drive for driving the auger, a mixing cone in coaxial alignment with the mixing auger, and drive means for moving the mixing cone in linear movement toward said auger, improved spring biased mounting means for mounting said auger to said motor driven drive, said improved spring biased mounting means comprising
a drive shaft associated with said motor driven drive;
a hollow, elongate opening extending coaxially inward from the end of said drive shaft, said hollow, elongate opening having a diameter such that the cylindrical mounting shaft of said auger can be received therein for axial, telescopic movement therewithin;
a spring mounted within said hollow, elongate opening to provide spring force against the end of said cylindrical mounting shaft of said auger when said cylindrical mounting shaft is inserted within said hollow, elongate opening; and
second mounting means for mounting the end of said cylindrical mounting shaft of said auger within said hollow, elongate opening such that said cylindrical mounting shaft can move to and fro within said hollow, elongate opening.

30. The improvement in a frozen dessert mixing machine in accordance with claim 29, wherein said second mounting means comprises
a pair of elongate grooves in the side of said cylindrical mounting shaft of said auger, said pair of elongate grooves extending longitudinally inward from the otherwise free end of said cylindrical mounting shaft; and
a pair of pins projecting outwardly from the hollow, elongate opening,
whereby said pins extending from said hollow, elongate opening are received within the grooves of said cylindrical mounting shaft for sliding movement therealong.

31. The improvement in a frozen dessert mixing machine in accordance with claim 30, wherein each of the elongate grooves in said cylindrical mounting shaft of said auger comprises
an initial, relatively short section extending inwardly from the otherwise free end of said cylindrical mounting shaft substantially parallel with the longitudinal axis of said cylindrical mounting shaft;
a second, relatively short section having first and second ends, said second section extending substantially circumferentially of said cylindrical mounting shaft, with the first end opening to the inner end of said initial section; and
a third, relatively long section extending from the second end of said second section in a direction away from the otherwise free end of said cylindrical mounting shaft, said third section being substantially parallel with the longitudinal axis of said cylindrical mounting shaft.

32. The improvement in a frozen dessert mixing machine in accordance with claim 31, wherein the second end of said second section of each of the elongate grooves in said cylindrical mounting shaft of said auger is provided with a notch which extends toward the otherwise free end of said cylindrical mounting shaft and in alignment with said third section of each of said elongate grooves.

33. The improvement in a frozen dessert mixing machine in accordance with claim 29, wherein said second mounting means comprises
a pair of elongate grooves in the side of said elongate opening in said drive shaft, said pair of grooves extending along the side of said elongate opening from the open end of said elongate opening; and
a pair of pins projecting outwardly from the cylindrical mounting shaft of said auger,
whereby said pins on said cylindrical mounting shaft are received within the grooves of said elongate opening for sliding movement therealong.

34. The improvement in a frozen dessert mixing machine in accordance with claim 33, wherein each of the elongate grooves in said elongate opening in said drive shaft comprises
an initial, relatively short section extending inwardly from the open end of said elongate opening substantially parallel with the longitudinal axis of said elongate opening;
a second, relatively short section having first and second ends, said second section extending substantially circumferentially of said elongate opening, with the first end opening to the inner end of said initial section; and
a third, relatively long section extending from the second end of said second section in a direction away from the open end of said elongate opening, said third section being substantially parallel with the longitudinal axis of said elongate opening.

35. The improvement in a frozen dessert mixing machine in accordance with claim 34, wherein the second end of said second section of each of the elongate grooves in said elongate opening is provided with a notch which extends toward the open end of said elongate opening and in alignment with said third section of each of said elongate grooves.

36. The improvement in a frozen dessert mixing machine in accordance with claim 29, wherein there is further provided a housing to contain the mixing auger, the motor driven drive for driving the auger and the mixing cone;

a first opening in said housing which communicates with a refrigerated compartment of a freezer when said housing is placed adjacent to the freezer;

a second opening in said housing; and a fan associated with said housing for (a) drawing cooling air from the refrigerated compartment through said first opening in said housing, (b) circulating the cooled air about the auger and mixing cone within said housing and (c) exhausting the circulated, cooled air from said housing through said second opening in said housing.

* * * * *